Figure 1:
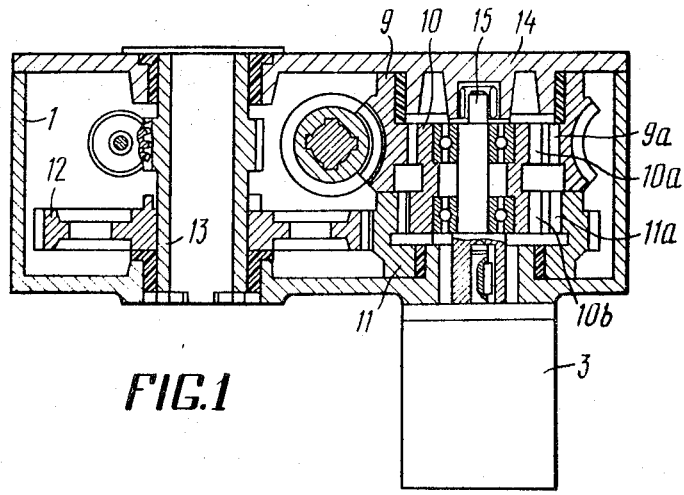

United States Patent [19]
Klotsvog

[11] 3,788,165
[45] Jan. 29, 1974

[54] TWO-SPEED DRIVE

[76] Inventor: Grigory Naumovich Klotsvog, ulitsa Mokhovaga, 26, kv. 9, Leningrad, U.S.S.R.

[22] Filed: Aug. 17, 1971

[21] Appl. No.: 172,414

[52] U.S. Cl. .................. 74/675, 74/661, 74/665 C
[51] Int. Cl. ........................................ F16h 37/06
[58] Field of Search .......... 74/661, 675, 626, 665 C

[56] References Cited
UNITED STATES PATENTS

| | | | |
|---|---|---|---|
| 1,948,709 | 2/1934 | Hackethal | 74/675 X |
| 2,300,343 | 10/1942 | Clay | 74/675 X |
| 3,213,711 | 10/1965 | Van Den Kieboom | 74/675 |
| 3,308,684 | 3/1967 | Wilkinson et al. | 74/675 X |
| 3,449,982 | 6/1969 | Hutchinson et al. | 74/675 X |

*Primary Examiner*—Arthur T. McKeon
*Attorney, Agent, or Firm*—Eric H. Waters et al.

[57] ABSTRACT

A drive for controlling valves comprising a worm-gear speed reducer whose worm is rotated by an electric motor and whose worm wheel is connected by a planetary reduction gear to the output shaft of the drive. The planetary reduction gear is comprised of a planet pinion engaged with internal tooth rims respectively formed on the worm wheel and on a gear wheel meshing with the output shaft of the drive. A change of the torque on the shaft switches the control circuit of the electric motor thus changing the rotation speed of the output shaft.

3 Claims, 2 Drawing Figures

PATENTED JAN 29 1974 3,788,165

TWO-SPEED DRIVE

The present invention relates to drives intended to transmit torque to actuating mechanisms or elements thereof, and more specifically it relates to a two-speed drive.

More especially, the present invention can be utilized for fluid control valves, particularly those of large size.

It is well known that the closing and opening of valves requires a considerably changing torque. The maximum torque is required for closing the valve and for starting it from rest at the beginning of its opening while most of the time the drive utilizes the torque only for overcoming the resistance of the flexible elements (bellows, springs, etc)., the forces of friction in the gland, and the weight of the movable parts of the valve.

Furthermore, if the valves are closed rather quickly, the moment of closing the pipe bore may be accompanied by a hydraulic impact with a resultant dangerous pressure rise inside the pipeline in close proximity to the valve which may, in particularly critical cases, affect adversely the operation of the pumping station.

The above-mentioned problems can be solved by using known two-speed drives wherein the valve closing element undergoes the largest part of its travel at a high speed with a low torque, the drive being switched over to low speed only during the last phase of closing or the initial stage of opening, producing a high torque for this purpose.

Known in the art is a two-speed drive comprising an electric motor which rotates a shaft, a worm of a speed reducer being installed on said shaft with provision for elastic axial movement so that said worm, moving axially due to an excess torque on the output shaft, cuts off the motor, thus limiting the produced torque. The worm wheel of the speed reducer is connected to the output shaft.

The speed of the output shaft in such drives is changed in accordance with the number of revolutions executed by said output shaft and this speed change is performed by an electromagnetic friction coupling.

This coupling is controlled by a solenoid which is switched on by a sliding contact whose movable element is linked kinemattically with the output shaft.

A disadvantage of such drives is that the rotation speed of the output shaft is changed only in accordance with the path covered (i.e. the number of revolutions executed by the shaft) and not in accordance with the required torque. As a result, in case of an emergency rise of the torque at the beginning or in the middle of the travel of the valve element, for example during valve closing, the drive at this moment producing but a low torque, stalls and fails to fulfill its function.

Additionally, the use of a sliding electric contact sending a pulse signal to the solenoid which changes the drive speed, is unreliable, particularly for drives operating under severe atmospheric conditions and subjected to vibration.

An object of the present invention is to provide a two-speed drive which automatically changes the speed of the output shaft to adapt to changes in the actual torque on the shaft of the actuating mechanism.

Another object of the present invention lies in providing a drive in which the actuating mechanism is protected against overloads, particularly at the moment of valve closing, said overloads occurring due to inertia of the electric motor and the movable elements of the drive.

This object is achieved by connecting the worm wheel of a two-speed drive with the output shaft, in accordance with the invention, by a planetary gear constituted by two tooth rims, one located on the internal surface of the worm wheel and the other, on the internal surface of the gear wheel connected with the output shaft, and by a planet pinion meshing with both of said tooth rims and mounted freely on an eccentric shaft, the changes in the torque on the output shaft leading to the switching over of the control circuit and thus ensuring alternate rotation of the worm shaft or eccentric shaft and changing the speed of the output shaft.

In one embodiment of the invention it is preferable that the worm shaft and the eccentric shaft should be rotated by individual electric motors connected to a common control circuit.

The drive may be provided with additional electric contacts which stop the eccentric shaft motor when the preset torque on the output shaft is exceeded, and turn on the worm shaft motor for a short time, thus releasing the brake wheel of the planetary gear.

Such a construction of the two-speed drive in the form of a combined worm-and-planetary gear with one or two electric motors wherein the worm wheel functions simultaneously as a brake element of the planetary gear makes it possible to transmit a low torque at a high rotation speed of the output shaft (in this case the self-braking planetary gear has no influence on the speed ratio of the speed reducer) and a high torque at a low rotation speed of the output shaft via the planetary reduction gear (in which case the worm acts as an element locking the braking wheel of the planetary gear). At the moment of overload, the gear produces a high torque, the worm drive is started and the worm rotating in the opposite direction releases the locked wheel of the planetary gear thus eliminating the inertia overloads.

Figure 2:
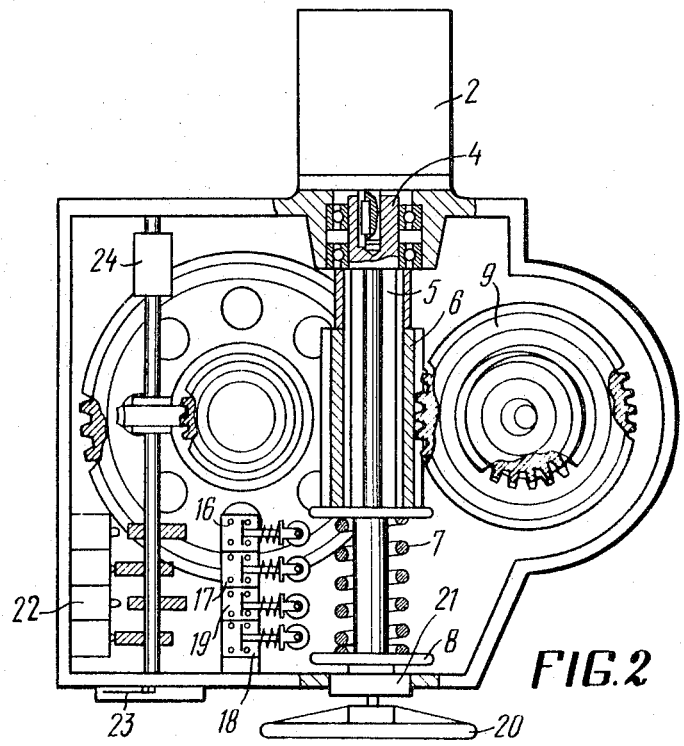

Now the invention will be described in detail by way of example with reference to the accompanying drawings, in which:

FIG. 1 is a vertical sectional view of the two-speed drive according to the invention; and FIG. 2 is a top view thereof with the housing cover removed.

The two-speed drive consists of a housing 1 (FIG. 1) on which two electric motors 2 and 3 are mounted (FIG. 2). The motor 2 is connected by coupling 4 with a splined shaft 5 carrying a worm 6 which is held against axial movement over the splines by a spring 7 located between the worm 6 and a washer 8.

The worm 6 is in mesh with a worm wheel 9 which has a tooth rim 9a on its internal surface, said tooth rim 9a interacting with one of the tooth rims 10a of a planet pinion 10. A second tooth rim 10b of the planet pinion 10 meshes with the internal tooth rim 11a of a gear wheel 11, the latter meshing with the gear wheel 12 of the output shaft 13.

Shaft 13 is rotatably mounted in the housing 1 and cover 14, is intended to transmit torque to the spindle (not shown) of a valve.

The planet pinion 10 of the planetary gear is installed on an eccentric shaft 15 which is coupled to the electric motor 3.

The rotation speed of the output shaft 13 is changed and the torque produced by the drive is limited by the electric contacts 16, 17, 18 and 19 of the control circuit of the electric motors 2 and 3.

The drive is provided with a handwheel 20 with a known mechanism 21 for automatic disconnection of the handwheel 20 when the drive is controlled by the electric motor 2 or 3. The drive further comprises a known assembly of limit electric contacts 22, a local valve position indicator 23, and a potentiometer 24 for remote indication of the valve position.

The above-described drive operates as follows.

For closing the valve, the electric motor 2 is started and begins rotating the splined shaft 5 with the worm 6 thus rotating the worm wheel 9 which transmits the torque via the planet pinion 10 and wheel 11 to the wheel 12 of the output shaft 13.

The transmission ratio from the electric motor 2 to the wheel 12 is equal to that of the worm gear since the planetary gear in this case has no influence on the degree of reduction of the drive. As a result, the output shaft 13 rotates at a high speed and the drive produces but a small torque.

In such condition, the drive continues operating until the torque on the valve spindle rises to a limit exceeding the setting of the spring 7.

As this setting is exceeded, the worm 6 starts moving along the splines of the shaft 5 and presses the electric contact 16 which turns off the electric motor 2 and starts the electric motor 3. In this position the worm 6 locks the wheel 9 which allows the electric motor 3 to transmit torque via the planetary gear (15, 10a, 9a, 10b, 11a) to the gear wheel 12 of the output shaft 13.

The speed ratio between the electric motor 3 and the gearwheel 12 (with motor 2 stopped) is equal to that of the planetary gear. In this case the output shaft 13 rotates at a low speed and the drive produces a high torque. In this condition, the valve element is sealed.

When the torque on the valve spindle rises to a limit ensuring the pressure tightness of the valve, the output shaft 13 is stationary and the electric motor 3, which continues running, moves the worm over the splines of the shaft with the aid of the worm wheel 9.

Due to this axial motion, the worm 6 overcomes the resilient resistance of the spring 7, moves from the interlocked contact 16 to operate the electric contact 17 which stops the motor 3 and simultaneously starts the motor 2 in the direction for opening the valve.

The electric motor 2 rotates the worm 6 which releases the braked wheel 9 so that the moment of inertia developed by the motor 3 which is still rotated by inertia is not transmitted to the valve spindle. The worm 6 returns to the initial position, open the contact 17 and the latter cuts off the motor 2. Thus the valve becomes closed.

To open the valve, the operations are reversed with the single exception that the circuits of the motors 2 and 3 are switched by the electric contacts 18 and 19 which are actuated by the washer 8 connected with the worm 6.

What is claimed is:

1. A two-speed drive comprising: a first electric motor; a shaft drivingly coupled to said motor, control means including a worm mounted on said shaft for rotation therewith but with provision for elastic axial movement thereon, electric contact means disposed in the path of travel of said control means for controlling the operation of said motor when contacted by said control means, a worm wheel meshing with said worm and including an internal tooth rim, an output shaft, a gear wheel drivingly connected to said output shaft and including an internal tooth rim, a planet pinion meshing with both of said tooth rims and forming, together therewith, a planetary gear assembly, an eccentric shaft, and a second electric motor drivingly coupled to said eccentric shaft and controlled by said control means, said planet pinion being freely mounted on said eccentric shaft, such that a change in torque on said output shaft causes the worm to displace on said shaft connected to the first motor and operate said contact means to effect selective rotation of said worm shaft or said eccentric shaft while changing the rotation speed of said output shaft.

2. A drive according to claim 1 wherein said electric contact means includes respective contacts for said motors assembled in a common control circuit.

3. A drive according to claim 1 wherein said electrical contact means includes electric contacts positioned to be engaged by said control means when a predetermined torque on said output shaft is exceeded to stop said second electric motor then rotating said eccentric shaft and momentarily start said first electric motor thus releasing said tooth rim of the worm wheel to decouple the planetary gear assembly.

* * * * *